United States Patent [19]

Oda et al.

[11] 4,014,495

[45] Mar. 29, 1977

[54] AUTOMATIC WELDING APPARATUS

[75] Inventors: Tatsuharu Oda, Toyonaka; Yukio Iwasaki; Hideo Koyamd, both of Takarazuka; Shigeo Maruyama; Takashi Matsubara, both of Nishinomiya; Keiichi Hozumi, Takarazuka; Hiroya Kano, Ashiya, all of Japan

[73] Assignee: Shin Meiwa Industry Co., Ltd., Japan

[22] Filed: Sept. 6, 1974

[21] Appl. No.: 503,879

[30] Foreign Application Priority Data

Feb. 22, 1974 Japan .................. 49-21824[U]
May 14, 1974 Japan .................. 49-54131
June 6, 1974 Japan .................. 49-64672

[52] U.S. Cl. .................. 228/7; 228/25; 228/47; 219/12.4; 219/119
[51] Int. Cl.[2] .................. B23K 37/02; B23K 5/02; B23K 11/30
[58] Field of Search .................. 228/7, 102, 95, 47, 228/25; 219/124, 125 PL, 85, 119

[56] References Cited

UNITED STATES PATENTS

| | | | |
|---|---|---|---|
| 3,393,370 | 7/1968 | Bauer | 219/124 X |
| 3,443,732 | 5/1969 | Wall | 228/7 |
| 3,542,996 | 11/1970 | Bollinger | 228/7 X |
| 3,643,060 | 2/1972 | Carter | 219/124 X |
| 3,646,311 | 2/1972 | Cameron | 219/224 X |

*Primary Examiner*—Gary L. Smith
*Attorney, Agent, or Firm*—Staas & Halsey

[57] ABSTRACT

An automatic welding apparatus comprising a workpiece fixture carried by a moving member for rotation about a horizontal axis extending in a back and forth direction, said moving member being provided on a carriage for sliding movement in a lateral direction, said carriage being provided for sliding movement in said back and forth direction, and a torch fixture carried by an arm for rotation about a vertical axis, said arm being provided for sliding movement in the vertical direction. In another embodiment, the workpiece fixture is provided only for rotation about a horizontal axis extending in the back and forth direction, and the torch fixture is carried by the arm for rotation about the vertical axis, which arm is provided at the end of a column for sliding movement in said lateral direction, which column is provided on a sliding member for sliding movement in the vertical direction, which sliding member is provided on a guide for sliding movement in said back and forth direction. The movement of these components is controlled in an electronic manner in accordance with a preset, i.e. predetermined data. The degree of freedom of the movement of the workpiece and torch is thus divided into both workpiece and torch fixtures and as a result welding a workpiece of complicated shape is possible in a better attitude of the torch and the workpiece.

16 Claims, 16 Drawing Figures

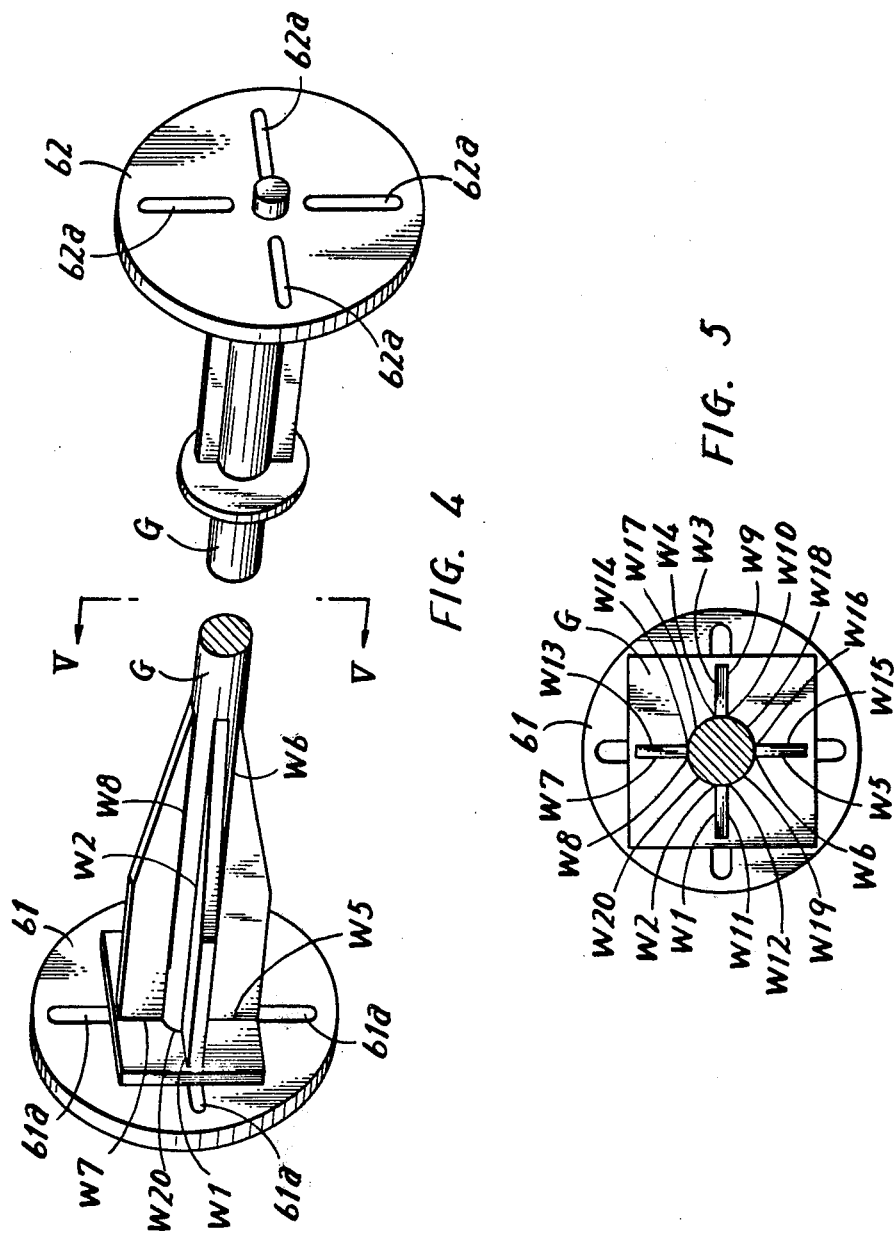

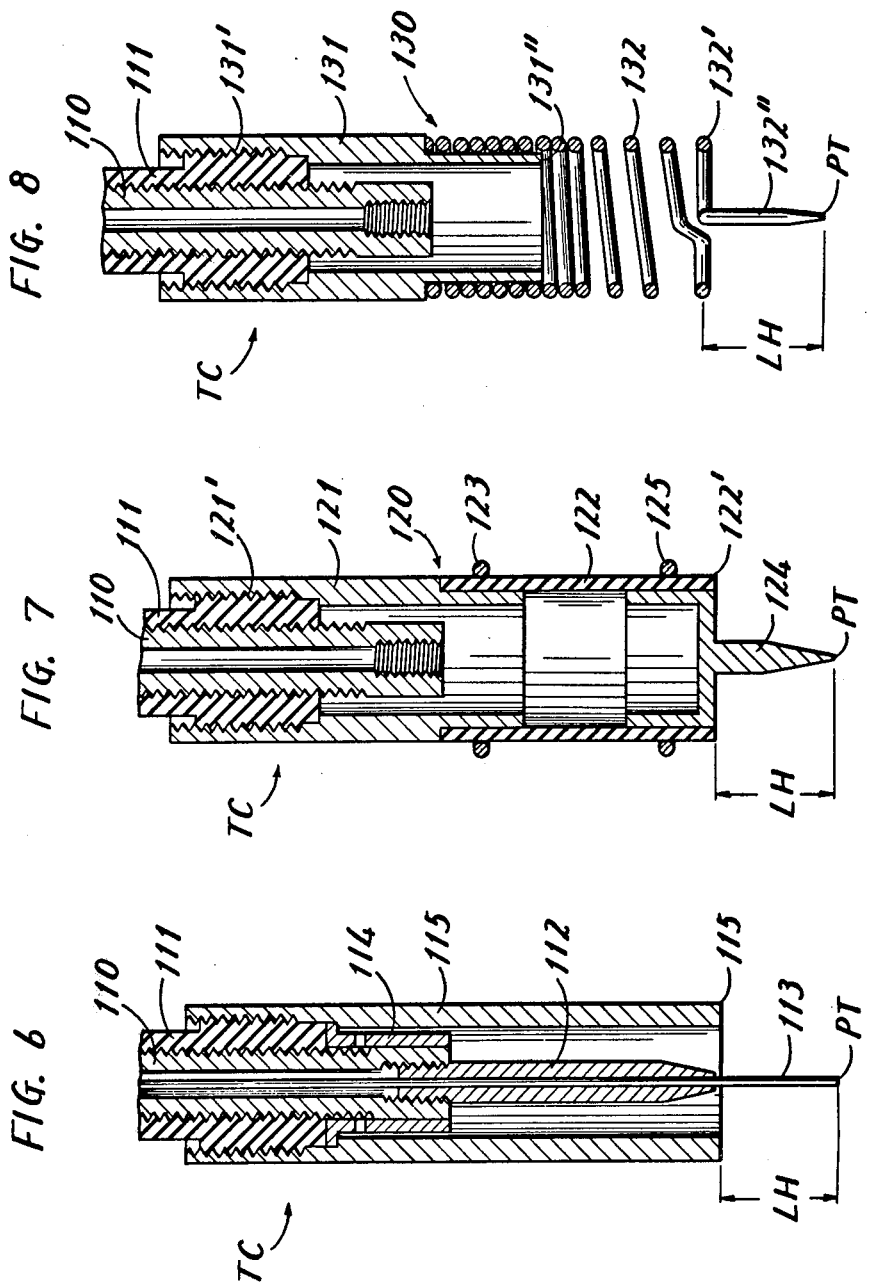

AUTOMATIC WELDING APPARATUS

BACKGROUND OF THE INVENTION

The present invention relates to an automatic welding apparatus. More specifically the present invention relates to an improved automatic welding apparatus wherein tracing of the welding point is automatically performed in accordance with a preset or predetermined data.

Generally, in welding the workpiece of complex shapes in three dimensions, as distinguished from a plane and simple welding operation, it is required that the degree of freedom of the movement involved in the automatic welding apparatus be increased. However, the conventional automatic welding apparatus has been constructed that, for example, the fixture for the workpiece is fixedly secured, while the position of the torch fixture is movably controlled, namely, most of degrees of freedom or freedom degrees have been given to either one of the two fixtures. Accordingly:

1. When all the necessary freedom degrees have been given to the torch fixture, the worst welding condition, namely, a so-called upward welding operation can not be avoided;
2. The structure of a fixture which provides all the necessary freedom degrees becomes extremely complex; and
3. In the welding apparatus adapted to control spatial positions of cylindrical coordinates or polar coordinates, programming is extremely difficult particularly in control of a so-called PTP (Point To Point) system, since a welding line of the workpiece is generally in three directions such as longitudinal, lateral and vertical directions. Also, to avoid the difficulties, an interpolating means must be provided in the control device, thus resulting in a complex control device.

On the other hand, the control device, particularly, a position control device which has been used so far is classified mainly as a PTP type (Point To Point) and a CP type (Continuous Path). The PTP type of position control device is simple in construction and lower in cost, but its operation is not continuous, while the CP type of position control device is continuous in its operation, but is complex in construction, difficult to operate, and impractical. For example, in controlling the movement of the welding torch, the welding torch stops at each of its specified points with the conventional PTP control device. Accordingly, if the specified points are increased in number to perform controlling as close to a curve as possible, stop points are increased in number, thus making the welding finish worse. Accordingly, it is desirable that the position control device of the PTP type is improved to make its operation more continuous.

Therefore, it is a primary object of the present invention to provide an automatic welding apparatus, which is simplified in its mechanical construction and in its control device, wherein the necessary degree of freedom is divided between a fixture for a workpiece and a fixture for a torch to control the mutual positional relationship of the workpiece and the torch so that the welding operation may be performed under a better attitude of workpiece and torch in terms of welding conditions.

It is another object of the present invention to provide an automatic welding apparatus including a position control device of a PTP type which is capable of continuously controlling the position of an object to be controlled.

Still other objects and features of the present invention will be more apparent from the following detailed description taken in conjunction with the drawings.

SUMMARY OF THE INVENTION

According to the present invention, a fixture for a workpiece is adapted to be rotatable around a horizontal axis, while a fixture for the torch is adapted to be rotatable around a rotation axis. Furthermore, relative positions of the fixture for the workpiece and the fixture for the torch are movably located in the spatial three dimensions such that the rotational and positional movement is achieved, and these speeds may be controlled.

For example, the necessary degree of freedom of the movement is divided such that the positions of the torch fixtures and the work fixtures are controlled so that the torch fixture may be carried by an arm movable in longitudinal, lateral and vertical directions, and may rotate around a vertical axis, and the workpiece fixture may rotate around a horizontal axis in the same direction as the abovementioned longitudinal or lateral direction. Thus, even in welding the workpiece of complex shapes, the welding operation can be effected under a better attitude of workpiece and torch in terms of welding conditions such as downward welding operation. The mechanical construction of the welding apparatus or the control device is also simplified. Furthermore, even bigger workpieces can be handled.

Also, the present invention includes a position control device for controlling the position of the workpiece through driving of a servo system by outputting, through a shift register and a buffer register, a position command from a programming unit such as a paper tape and its driving unit, etc. The position control device steps the programming unit by a signal from a zero signal generating means so disposed as to extract a signal of when output of a servo amplifier of the servo system has become near zero. The position command is loaded in the shift register, and the position command which was loaded before into the shift register is loaded into the buffer register by the store signal and is given to the servo system.

DESCRIPTION OF THE DRAWINGS

FIG. 4 is a perspective view showing how a workpiece is fitted to a workpiece fixture, FIG. 5 is a sectional view taken along a line V—V of FIG. 4, FIG. 6 is an enlarged view showing a torch for MIG welding which is now commercially available, FIG. 7 is a sectional view showing how an adapter of one embodiment is engaged with the end portion of the torch, FIG. 8 is a sectional view showing how an adapter of another embodiment is engaged with the end portion of the torch.

DESCRIPTION OF THE PREFERRED EMBODIMENTS

Figure 1:
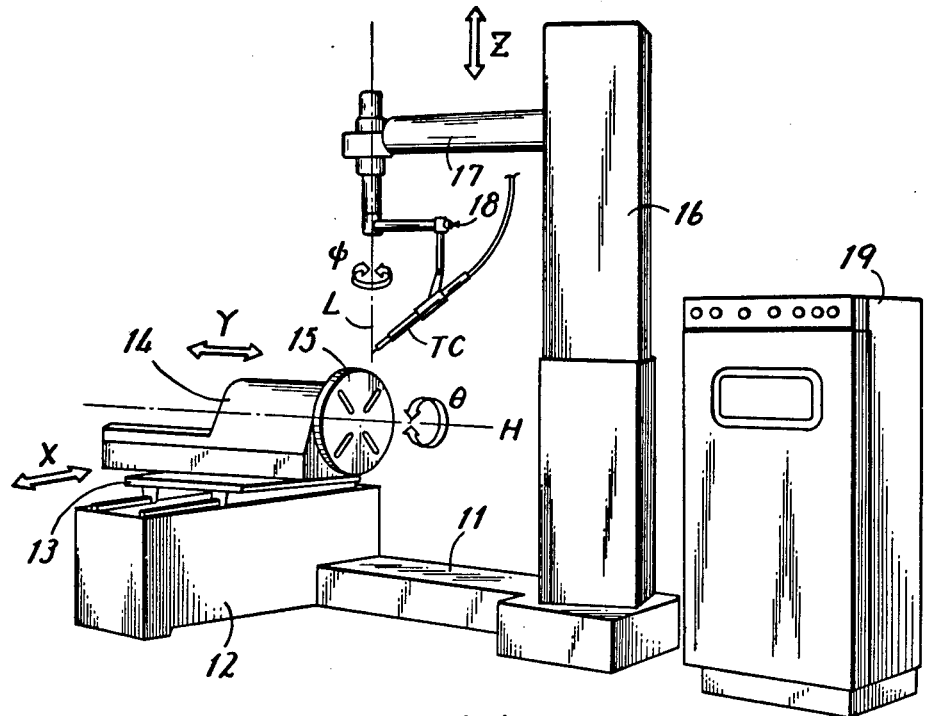
FIG. 1(A) is an entire perspective view showing an automatic welding apparatus of one embodiment of the present invention.
FIG. 1(B) is a perspective view showing how a workpiece is fitted to a workpiece fixture.
Figure 1:
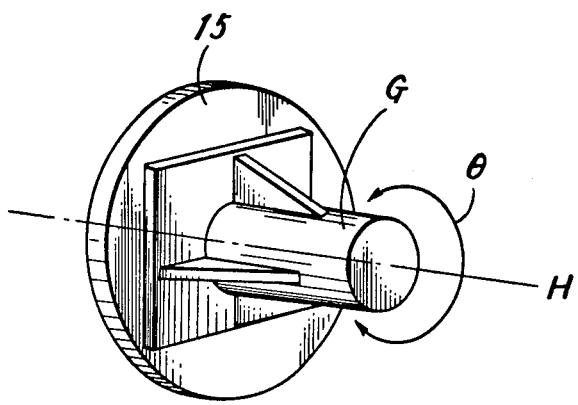

FIG. 1(A) is an entire perspective view showing an automatic welding apparatus of one embodiment of the present invention. FIG. 1(B) is a perspective view showing how a workpiece is fitted to a workpiece fixture. The automatic welding apparatus of the embodiment is constructed to allow a fixture for the workpiece G to move in a back and forth direction Y and a lateral direction X and to rotate around a horizontal axis H, and to allow the fixture for the torch TC to move in a vertical direction Z and to rotate around a vertical axis L. Furthermore, a control device 19 is provided which is adapted to automatically control the movements and rotating positions of the workpiece G and the torch TC.

The present welding apparatus will be described hereinafter more fully. A floor plate 11 and a first frame member 12 are fixedly secured in an L-shaped plane. A carriage 13 which can move in a lateral direction, as shown as X in the drawing, is provided on the top of the frame member 12. A prime mover for the carriage 13 (not shown) is a motor, with a brake, and having a known reduction gear in the embodiment. A power transmitting means (not shown) is an engaging means (so-called ball screw) of a known ball nut and screw rod. Also, a second frame member 14, which can move in the back and forth direction, as shown as Y in drawing, is disposed on the top of the carriage 13. A prime mover and a power transmission means for the frame 14 (not shown) are also a motor, with a brake, and having a known reduction gear, and a so-called ball screw.

A fixture 15 for the workpiece G is provided in the front portion of the frame member 14, the fixture being capable of rotating around the horizontal axis H of the same direction as the Y direction, as shown as θ in the drawing. A prime mover for the fixture 15 (not shown) is also a motor, with a brake, and having a known reduction gear similar to that as described hereinabove. The horizontal axis H may be chosen in the same direction as the X direction.

Figure 2:
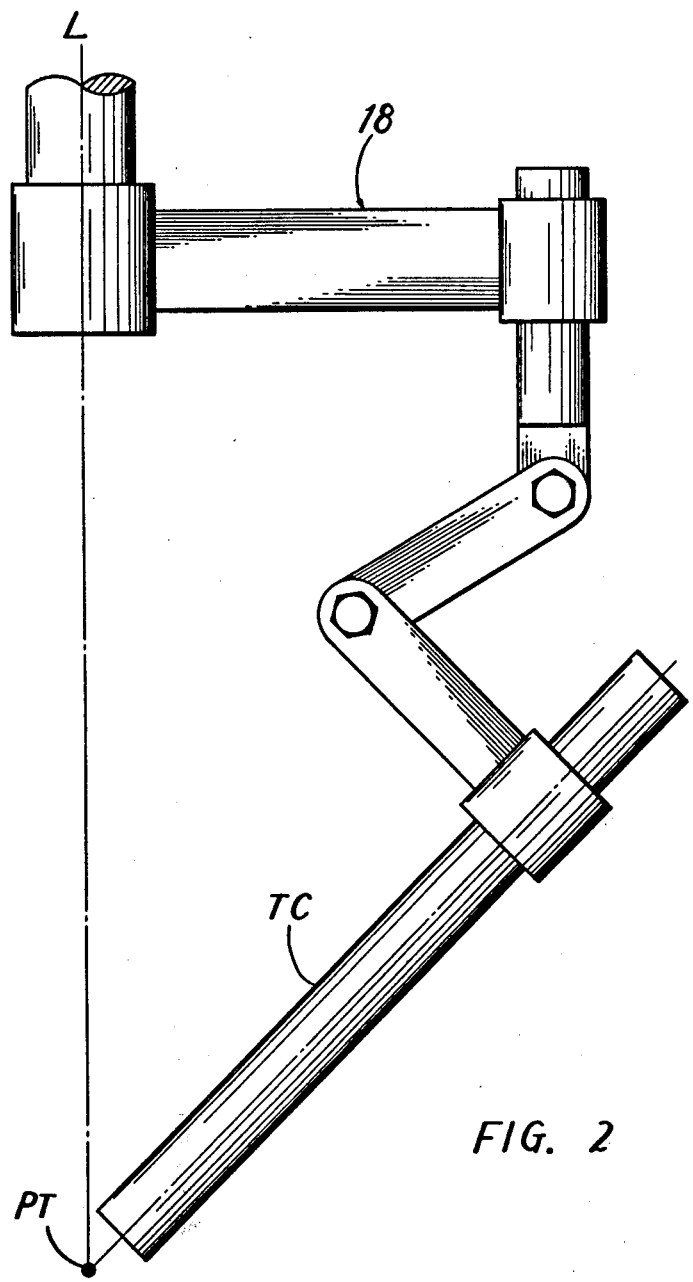
FIG. 2 is an enlarged view of the welding torch and arm of the FIG. 1 apparatus.

A third frame member 16 is erected upright in a position on the plate 11 farthest from a position where the frame member 12 of the floor plate 11 is secured. An arm 17 which extends in the back and forth direction and can move in the vertical direction as shown as Z in the drawing is disposed on the frame member 16. A prime mover and a power transmitting means for the arm 17 (not shown) are also a motor, with a brake, and having a known reduction gear and a so-called ball screw as described hereinabove. A fixture 18 for the torch TC which can rotate around the vertical axis L in the direction as shown φ in the drawing is mounted in the front end of the arm 17. A prime mover for the fixture 18 is also a motor, with a brake, and having a known reduction gear as described hereinabove. A position where the torch TC is mounted is chosen such that a welding point PT on a line extending from a central line of the torch TC may be aligned with a vertical axis L, as shown in detail in FIG. 2. Furthermore, a mounting angle for the torch TC is properly chosen in accordance with the kinds of welding means to be employed (butt welding or fillet welding, etc.) or shapes of the workpiece G. etc.

The control device 19 automatically controls a normal or reverse rotation of each of the prime movers (a motor, with a brake, and having a reduction gear), and current flow of the welding torch, etc. according to a preset program and controls the relative positions of the fixture 15 for the workpiece G and the fixture 18 for the torch TC so that the welding point PT may be along the welding line of the workpiece G, thereby effecting the automatic welding under the best attitude of the workpiece and the torch in terms of the welding conditions.

In automatically welding the workpiece G, all that is necessary is to program the control device 19 so that the welding point PT may be along a welding line of the workpiece G and the angle of the torch TC during the welding operation may assure the best attitude, and then to operate the control device 19. Accordingly, the fixtures 15 and 17 are operated as programmed hereinabove, whereby the automatic welding operation of the workpiece G is performed.

In this embodiment, since the welding point PT on a line extending from a central line of the torch TC is constructed to agree with or be aligned with the vertical axis L, the position of the welding point is constant despite the φ directional rotation of the fixture 18. Thus, the attitude of the torch TC can be varied optionally, with respect to the same welding point P on the workpiece, only by rotation of the fixture 18, which simplifies the programming of the control device 19. Also, since the frame member 16 is disposed outside of the movable range of the frame member 14, the frame member 16 does not interfere with the workpiece G even in case the size of the workpiece G along Y direction is remarkably large, despite the movement of the frame member 14 in the X direction, which allows for a satisfactory operation. Also, the frame member 16 does not interfere with attachment of the workpiece G to the fixture 15.

In the foregoing embodiment an automatic welding apparatus having five degrees of freedom has been described. However, for example, the freedom degree of the fixture 18 for the torch TC may be 3 in total by adding 1 freedom degree which allows a downward mounting angle of the torch TC to be varied optionally. Also, each of the prime movers may be a hydraulic unit, etc. Furthermore, the torch TC may be a MIG welding operation type or a TIG welding operation type.

The automatic control of the torch TC in the description given hereinabove can be effected continuously by the use of a position control device which is described in detail subsequently with reference to FIG. 11.

Figure 3:
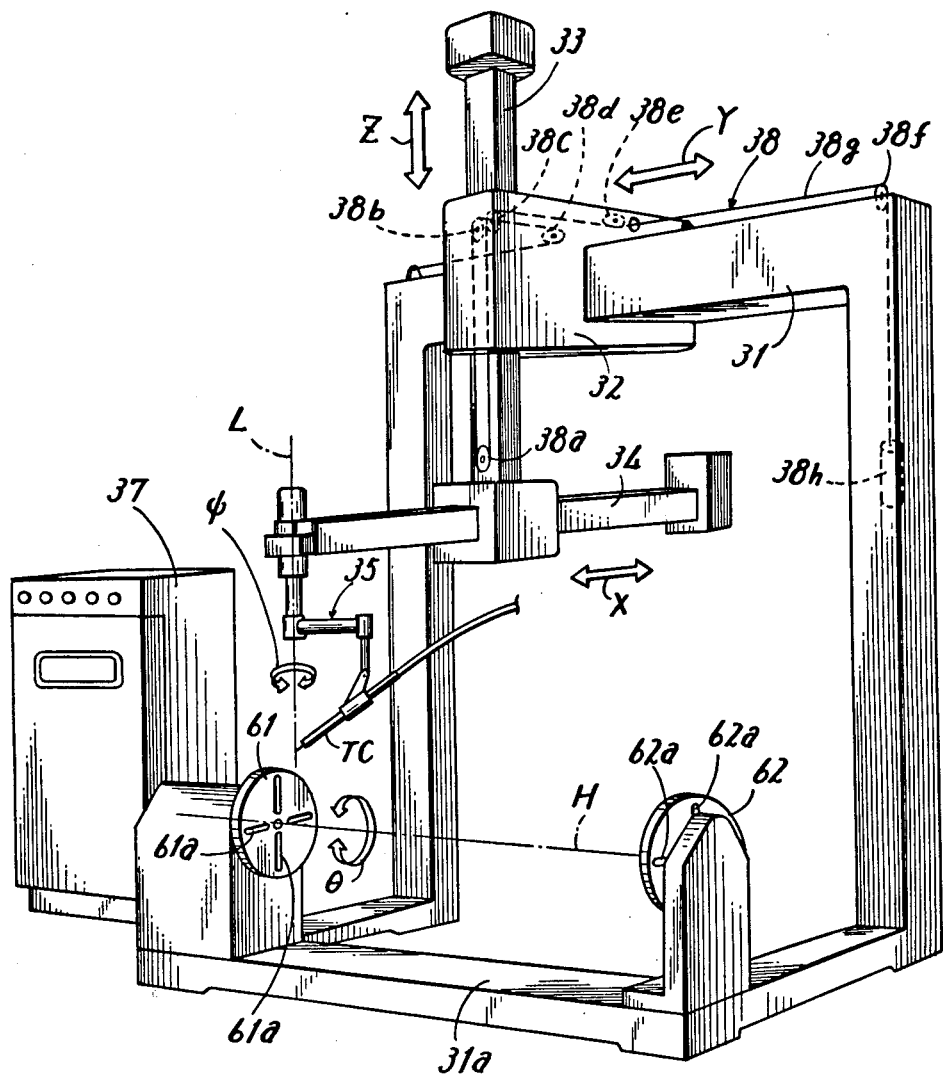
FIG. 3 is an entire perspective view showing an automatic welding apparatus of another embodiment of the present invention.

FIG. 3 is an entire perspective view of an automatic welding apparatus of another embodiment of the present invention. The characteristic of this embodiment is that the torch fixture 35 may move in a back and forth direction Y, a lateral direction X and a vertical direction Z and rotate around the vertical axis L. Referring to FIG. 3, a moving member 32 is disposed movably in a back and forth direction, as shown as Y in drawing, along a guide 31 provided extending in a horizontal direction. The moving member 32 is driven by a known prime mover. Also, a movable column 33 is carried by the moving member 32, movably in a vertical direction, as shown as Z in the drawing. The column 33 is, also, driven by a known prime mover, not shown. The stroke of the column 33 is chosen to a half of height of the guide 31 or less. An arm 34 which is movable in a lateral direction as shown as X in the drawing is carried at the lower end of the column 33 and is driven by a known prime mover, not shown. The torch fixture 35 is carried at the front end of the arm 34, and may rotate around a vertical axis L in a direction as shown as φ. A torch TC which is mounted after a mounting position or a mounting angle is adjustably determined is disposed in the fixture 35. In this embodiment, the mounting position is adjustably determined such that the position of the welding point of the torch TC may be located on the vertical axis L, or the mounting angle may be located in a proper angle in accordance with the shapes of the workpiece.

The workpiece fixtures 61 and 62 are mounted oppositely under the guide 31, and are rotatable in the direction as shown as θ around the same horizontal axis H of the same direction as the Y direction. In this embodiment, four elongated holes 61a and 62a are formed in a radial direction on the fixture discs 61 and 62, respectively. The fixture 61 is fixedly mounted on a floor plate 31a integral with the guide 31 and is driven by a prime mover, not shown. The fixture 62 is mounted, slidably in the direction of the horizontal axis H, on the floor plate 31a and is rotatable around the axis H.

Alternatively, the fixtures 61 and 62 may be disposed to rotate around the horizontal axis of the same direction as the X direction.

A unit 38 is mounted to balance the weight of the column 33, the arm 34, the fixture 35 and the torch TC. The unit 38 is composed of a pulley 38a mounted in the lower portion of the column 33 rotatably around the horizontal axis, pulleys 38b and 38c mounted in the moving member 32 rotatably around the horizontal axis, pulleys 38d and 38e mounted in the moving member 32 rotatably around the vertical axis, a pulley 38f mounted in one end upper portion of the guide 31 rotatably around the horizontal axis, a wire 38g and a weight 38h. The wire 38g is secured at its one end to the other end of the guide 31, namely, onto the side opposite to the pulley 38f side, and is entrained around the pulleys 38d, 38b, 38a, 38c, 38e and 38f, while the wire has the weight 38h hung down at its other end. The weight of the weight 38h is determined to one half of the total weight of the column 33, the arm 34, the fixture 35 and the prime mover therefor, and the torch TC.

FIG. 4 is a perspective view showing how the workpiece G is engaged with the workpiece fixture. FIG. 5 is a sectional view taken a line V—V of FIG. 4. The workpiece G has welding lines W1, W2, . . . W10, . . .

An example of operation will be described hereinafter with reference to FIGS. 3 to 5. First, the workpiece G is mounted on the fixtures 61 and 62, using jigs (not shown) associated therewith, and also the torch TC is mounted in the fixture 35 such that the position of the welding point may agree or align with the vertical axis L and the torch may be at a proper mounting angle.

The programming is performed by means of the control device 37 so that the position of the welding point may move along the welding lines W1, . . . W10, . . . of the workpiece G under a better attitude of the workpiece and torch in terms of welding conditions.

First, the workpiece G is welded with the welding lines W1, W2 and W3, W4 being placed under a downward attitude. Then, the fixtures 61 and 62 are turned rightwardly by 90° in FIG. 5, and until welding lines W5, W6 and W7, W8 come to agree with the positions of the welding lines W1, W2 and W3, W4 in FIGS. 4 and 5. Accordingly again, the welding operation may be performed with the welding lines W5, . . . W8 being placed under the downward attitude in the same manner as described above. Thus, the welding lines W9, . . . W12 are welded, with the welding lines W13, . . . W16 being placed under the downward attitude sequentially, while rotating the fixtures 61 and 62 to right by 90° for each rotation. Then, in welding a circular arc of the welding lines W17, . . . W20, the welding can be performed in the downward attitude, only if the fixtures 61 and 62 are rotated while the rotational position of the torch TC is varied.

In the embodiment, since the position of the welding point of the torch TC is located on the vertical axis L, the position of the welding point does not change despite the turning of the fixture 35, with the result that the program is simplified. Also, since the fixture 62 is slidable in the direction of the horizontal axis H and rotatable in the θ direction, elongation or torsion of the workpiece caused by welding operation can be relieved, and therefore, there is no change of adversely affecting the fixture 61 and its prime movers. Furthermore, since the column 33 is supported in a balancing fashion by the use of the balancing means 38, a large load is not applied upon the prime mover of the column 33 even when it moves upwardly, or the column 33 is loaded as low as when it moves downwardly.

In the foregoing the welding operation of the present invention has been described, centering on the FIG. 3 embodiment. However, substantially the same operation is performed by the FIG. 1 embodiment, with substantially the same result, as readily understood by those skilled in the art.

FIG. 6 is a sectional view of a typical torch and FIGS. 7 and 8 are views showing various adapters of the torch TC of the automatic welding apparatus described in FIGS. 1 and 3. FIG. 6 is a torch for MIG welding which is now commercially available. FIG. 7 is a sectional view showing how an adapter of one embodiment is engaged with the torch front end. FIG. 8 is sectional view showing how an adapter of another embodiment is engaged with the torch front end.

In the automatic welding apparatus described hereinabove, the programming is made so that the welding point PT which falls on a line extending from a central line of the torch TC may argee with the welding lines of the workpiece to be welded. In this case, in the torch for MIG welding as shown in FIG. 6, a filler metal 113 is projected from the torch to a position where its front end shows the welding point PT. Also, in case of the torch for TIG welding, for example, a needle whose front end shows a welding point is engaged with the torch front end. Even in both torches, it is necessary for the front end of the filler metal or the needle, namely, the welding point, be along the welding line of the workpiece under consideration of the torch attitude by manual operation of control switches of the control device (for example, in case of the automatic welding apparatus for controlling the position of the torch, switches for controlling the positions of back and forth direction, lateral direction, vertical direction, rotating direction, etc. of the torch). However, in effecting the operation, there may be chances of erroneously moving the torch to an unexpected position through inadvertence, such as wrong depression of the control switches or excessive depression thereof, etc. The filler metal or the needle, or the torch itself may contact the workpiece, whereby the filler metal or the needle may bend or be damaged, and the torch itself may change in position or be damaged. Accordingly, the front end welding point of the filler metal or the needle may change or be unknown in position and thus it is meaningless to continue the operation any more. In this situation, it is required to re-start the program from the beginning. Under consideration of these problems, there is provided with an adapter of a torch TC such as illustrated in FIGS. 7 and 8. The adapter of the torch TC is composed of a needle whose front end shows a welding point, and an elastic member carrying the needle, and is adapted to be removable from the torch front end. Prior to a detailed description of such adapter, the torch for MIG welding, as shown in FIG. 6, which is now commercially available, will be schematically described. The external periphery of a hollow torch body 110 is enclosed by an insulating material 111. A hollow tip 112 is removably constructed concentrically with the front end of the body 110. The filler metal 113 is inserted into the hollow portion of the body 110 and in the hollow portion of the tip 112. Furthermore, an orifice 114 is detachably constructed on the front end exterior periphery of the body 110. A cylindrical nozzle 115 is constructed so that it may be detachable from the front end of the insulating drum 111, surrounding the tip 112 and the orifice 114.

The welding point PT on a line extending from a central line of the torch TC is located in a position of the front end of the filler metal 113 in the drawing, namely, in a position of an interval LH away from the front end of the nozzle 115.

Then, the adapter which is removable from the front end of the torch TC will be described hereinafter with reference to FIGS. 7 and 8. Referring to FIG. 7, the adapter 120 is detachably mounted in the front end of the insulating drum 111 of the torch TC. Also, a screw 121' allows the fixture 121 to be detachable from the front end of the insulating drum 111. An elastic member 122 (hollow rubber in this example) is secured, in its basic end, to the front end external periphery of the fixture 121 by a retaining ring 123. A needle 124 is secured inside the front end of the elastic member 122 by a retaining ring 125. The adapter 120 is constructed to coincide with the welding point PT in a case where the adapter 120 is engaged with the insulating drum 111.

The elastic member 122 is adapted not to be bent due to only weight of the needle 124, etc., despite the attitude of the torch. Also, the diameter of the front end external periphery 122' of the elastic member is chosen to be equal to that of the front end external periphery 115' of the nozzle, and the distance from the front end of the elastic member 122 to the welding point PT of the front end of the needle 124 is chosen to be equal to the distance LH from the front end of the nozzle 115 to the welding point PT of the front end of the filler metal 113.

Referring to FIG. 8, the adapter 130 is detachably mounted in the front end of the insulating drum 111 of the torch TC. A screw 131' allows the fixture 131 to be detachable from the front end of the insulating drum 111. The elastic member 132 (coil spring in the embodiment) is secured, in its base end, to the external periphery of the front end of the fixture 131. A needle 132" is formed as an extended end of the elastic member 132. The front end of a needle 132" is so adapted as to agree with the welding point PT when the adapter 130 has been engaged with the insulating drum 111. The base end of the elastic member 132 is not provided with compressibility, the size of such noncompressible part being chosen at least longer than the size of the secured portion with the fixture 131.

The elastic member 132 is not either bent due to its own weight of the elastic member 132, irrespective of any attitude of the torch TC, as mentioned in the embodiment of FIG. 7. The diameter of the front end external periphery 132' of the coil is also chosen to be equal to that of the front end external diameter 115 of the nozzle. Furthermore, the distance from the front end of the elastic member 132 to the front end welding point PT of the needle 132" is also chosen to be LH.

In programming for a given workpiece to be welded in the playback system described hereinafter, first, the filler metal 113, the nozzle 115, the orifice 114, and the tip 112 are removed, and the adapter 120 or 130 is engaged with the insulating drum 111 by the screw 121' or 131' as shown in FIGS. 7 or 8. Then, the first end welding point PT of the needle 124 or 132" has to agree with and be along the welding line of the workpiece under consideration of the attitude, etc. of the torch TC with respect to the workpiece by manually operating the control switch of the control device (not shown). At this time, the needle 124 or 132", or the elastic member 122 or 132 is prevented from remaining bent or being damaged due to elasticity (bending or compression) of the elastic member 122 or 132, even if the front end external periphery 122' or 132' of the needle 124 or 132", or the elastic member 122 or 132 hits the workpiece undesirably. Hitting of the front end external periphery 122' or 132' of the elastic member against the workpiece, although the attitude of the torch TC is under the best welding condition, means an impossible welding operation under this attitude. In such as case, all that is necessary is to change the attitude of the torch if the welding condition becomes worse somewhat. After the program has been completed in this way, the adapter 120 or 130 is removed from the insulating drum 111 and the tip 112, the orifice 114, the nozzle 115, and the filler metal 113 are engaged again as shown in FIG. 6. Then, operation of the control devices causes the torch to be controlled repeatedly as programmed according to description given hereinafter.

In the adapters 120 and 130 in this embodiment, the respective diameter of the front end external periphery 122' and 132' of the elastic member is chosen to be equal to that of the front end external periphery 115' of the nozzle and also the distance from the respective front end of the elastic members 122 and 132 to the respective front end welding point PT of the needles 124 and 132" is chosen to be equal to be LH. Accordingly, if the front end external peripheries 122' and 132" of the elastic member hit the workpiece during the programming operation, it is conveniently found out that the welding operation by the torch under this attitude is impossible to be effected. Also, in the adapter 130, the front end external periphery of the fixture 131 is chamfered, and the base end of the elastic member 132 is constructed to be non-compressible. The size of this non-compressible portion is chosen to be at least longer than the size of the secured portion with the fixture 131. Accordingly, the elastic member 132 does not ride on the front end of the fixture 131 if the bending force is applied upon the elastic member 132. Thus, it can be restored to the original condition easily and thus the position of the welding point PT remains unchanged.

Figure 9:
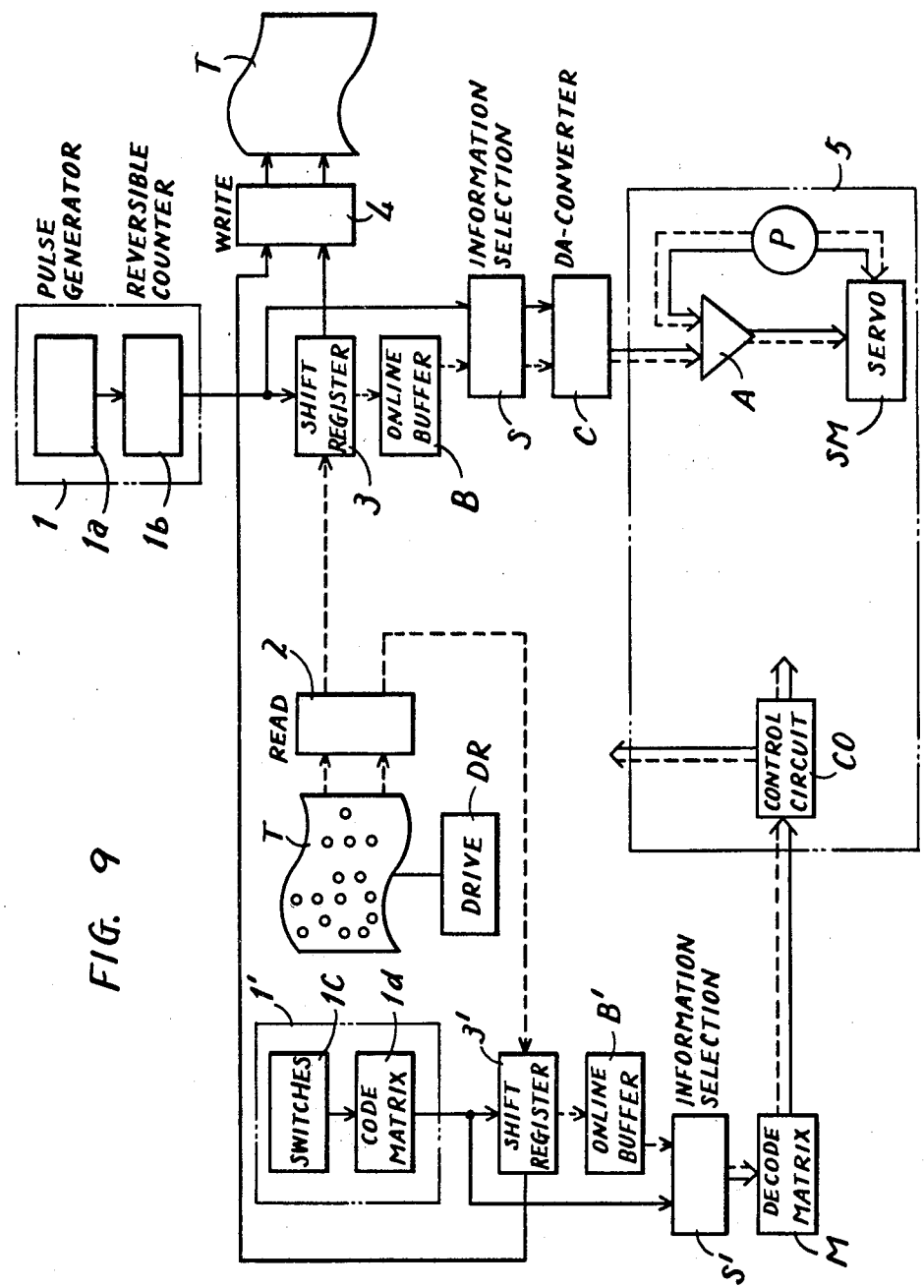
FIG. 9 is a block diagram showing a numerical control unit which serves as a basis for a position control device of one embodiment of the present invention.

FIG. 9 is a block diagram of a numerical control device which serves as a basis of the position control device in one embodiment in accordance with the present invention. The numerical control device is of a paper tape recording system, and comprises numerical input devices 1 and 1' which are capable of providing numerical values representing the condition of objects being controlled and the other pieces of information necessary for controlling, shift registers 3 and 3' which are capable of storing the output numerical values from either one of the devices 1 and 1', or a paper tape reader 2, and a paper tape writing device 4 which is connected to allow the output numerical values from the shift registers 3 and 3' to be written in the tape. During the writing of values in the paper tape T, the output numerical values from the numerical output devices 1 and 1', and during the reading of the paper tape T, the output numerical values through the shift registers 3 and 3' are selectively inputted to a control mechanism 5. More specifically, the output numerical values from the shift registers 3 and 3' are selectively applied to information selecting circuits S and S' through on-line buffers B and B', respectively, so that either output from the numerical output devices 1 and 1', or the reader 2 is selected. The output of the information selecting circuit S is converted into an analog value by a digital/analog converter C (hereinafter referred to as DA converter) and is applied to the control mechanism 5.

The numerical output device 1 comprises a manually operable pulse generator 1a and a reversible counter 1b. The device 1 is constructed to provide signals for controlling each position of the torch and the workpiece of the automatic welding apparatus, in accordance with numerical values coded in five-channel twelve bits. The generator 1a provides pulses in any desired manner, such as one by one for each channel, or any given number of pulses each time or a desired number of pulses, as required. The contents of the reversible counter 1b are changeable, as desired, for each channel to provide the corresponding pulse output. The numerical value of the contents of the reversible counter 1b is withdrawn as an output of the device 1.

The numerical output device 1' comprises a group of switches 1c and a coding matrix 1d. The device 1' is so adapted as to code control signals (described later) necessary for programming, other than the output numerical values from the device 1, in two-channel twelve bits through the matrix 1d by selectively operating a switch of the group switches 1c. The coded numerical value is taken out as an output of the device 1'.

The paper tape reader 2 is constructed to read numerical values contained in the punched paper tape T. In this embodiment, the paper tape T is a one-inch-wide punched paper tape with eight holes or channels for each row. Of these eight channels five channels are allocated to each of signals for controlling the each position in the X, Y, Z, $\theta$ and $\phi$ directions of the torch and workpiece fixtures of the automatic welding apparatus shown in FIGS. 1 and 3. Each of these channels is of twelve bits, thus forming one word. One channel of the remaining three channels is employed for control of the moving speed of the abovementioned position control, the magnitude of the welding current of the torch and the control of the interlock switch, so that this one channel is also of twelve bits. The other remaining one channel thereof is used for a parity check for each bit of the six channels, and also for word timing.

The shift registers 3 and 3' are of twelve bits respectively in this embodiment. The shift register 3 stores the output numerical values of five channels from the device 1. The shift register 3' stores the output numerical values of one channel from the device 1'. The numerical values stored in these shift registers 3 and 3' are sequentially outputted from a lower digit.

The paper tape writing device 4 is actuated by a command signal from another command device (not shown) and the numerical values stored in the shift registers 3 and 3' are written in the paper tape T sequentially. Namely, as described hereinbefore, the numerical values of the shift register 3 are written in the five channels out of the eight channels in the tape T by the output from the device 1, while the numerical values of the shift register 3' are written in the one channel by the output from the device 1'.

The output from the devices 1 and 1' and the output from the device 2 are inputted to the information selecting circuits S and S', respectively. When the device 4 is operated, the outputs from the devices 1 and 1', or when the device 2 is operated, the outputs from the device 2 through the registers 3 and 3' and the buffer B and B', are selectively outputted from the circuits S and S', respectively, by the command signal from another command device (not shown). The output from the circuit S' is given to a decode matrix M to decode the numerical value and a control signal commanded by the group of switches 1c is taken out.

The control mechanism 5 comprises a differential amplifier A, a potentiometer P and a servo system SM. The output of the potentiometer P varies with the condition of the servo system SM, and in this embodiment, with the position of each part of the automatic welding apparatus. An analog value which is the output of the potentiometer P is fed back to the differential amplifier A. On the other hand, the analog value from the DA converter C is also inputted or supplied to the differential amplifier A. Thus, the servo system SM is controlled so that the difference between two analog values which have been inputted to the differential amplifier A may be zero. The control mechanism 5 also includes a control circuit CO. The control circuit CO enables the output signal from the matrix M to control the speed and the torch welding current, and interlock with an external device, such as a timer (not shown).

The DA converter C is not required to be very accurate, if the mechanism 5 is constructed as illustrated, because the digital value of the input and the analog value of the output are not always required to be proportional. An operator operates the device 1, observing the action of an object to be controlled. The signal path going, in the writing mode, from the device 1 to the object being controlled, goes, in the reading mode, through the shift register 3, the on-line buffer B, the circuit S, the converter C, the amplifier A, and the servo system SM in just the same way. But at this time, if any distortion is provided in the converter C, the amplifier A and the servo system SM, just the same condition of the controlled object even in reading may be reproduced, so long as the distortion remains the same.

The operation thereof will be hereinafter described with reference to FIG. 9. First, a case where the write device 4 is operated will be described. First, each position of the torch and workpiece of the automatic welding apparatus is set to meet the program to be prepared. For this purpose, the device 1a is mannually operated and a pulse is generated for a given channel, whereby the numerical value of the reversible counter 1b is varied. At the same time, the numerical value is selected through the circuit S and furthermore is inputted into the DA converter C where it is converted into an analog value. The analog value is inputted into the mechanism 5 to control the servo system SM. The control of the servo system SM makes selection of the corresponding channel. For example, the position in the Z direction of the torch fixture of the automatic welding apparatus is controlled. The device 1a is mannually operated to cause the desired position, for example, for the channel. Similarly, operation of the device 1a for the corresponding channels individually with respect to the position in the X, Y, $\theta$ and $\phi$ directions of the automatic welding apparatus makes the apparatus be placed in the desired condition. Furthermore, by selectively operating the switch of the group switches 1c, for example, a signal for interlocking the timer which determines a retaining time of the desired condition of the automatic welding apparatus is outputted and thus a timer device (not shown) is controlled. After completion of these operations, the device 4 is actuated by the command device (not shown). The output numerical values from the device 1 and the output numerical values from the device 1' are written sequentially from the lower digit in each channel of the paper tape T in the form of punching through the register 3 and through the register 3', respectively, while the parity check is done. Thus, the writing operation of twelve bits about the certain point is completed, and then the twelve bits are again written about the following points by the same operation. By operating the switch of the group of switches 1c, it is possible to write commands for control of the moving speed and the torch welding current of the automatic welding apparatus. By repeating these operations, the devices 1 and 1' are operated repeatedly in the abovementioned manner to write the information in the tape T sequentially, while the object being controlled by the automatic welding apparatus is moved along the desired program.

Now the operation of the device 2 will be described hereinafter. The tape T thus prepared by the write device 4 is sent to the reader 2. At first, the device 2 reads the numerical values written in the tape T. The data read from the five channels out of these channels are inputted to the register 3, while the data read from the remaining one channel is inputted to the register 3'. Furthermore, the data go through the buffers B and B', and the circuits S and S' to the DA converter C and the matrix M, respectively. The numerical value which has reached the DA converter C is inputted to the amplifier A to control the servo system SM to a position corresponding to this numerical value signal. Also, the numerical value signal which has reached the control circuit CO controls the device DR and the other necessary portions. Accordingly, the servo system SM is controlled by the numerical values read from the device 2 sequentially as the tape T advances. Namely, in this embodiment, the automatic control of the automatic control of the automatic welding apparatus is effected.

Figure 10:
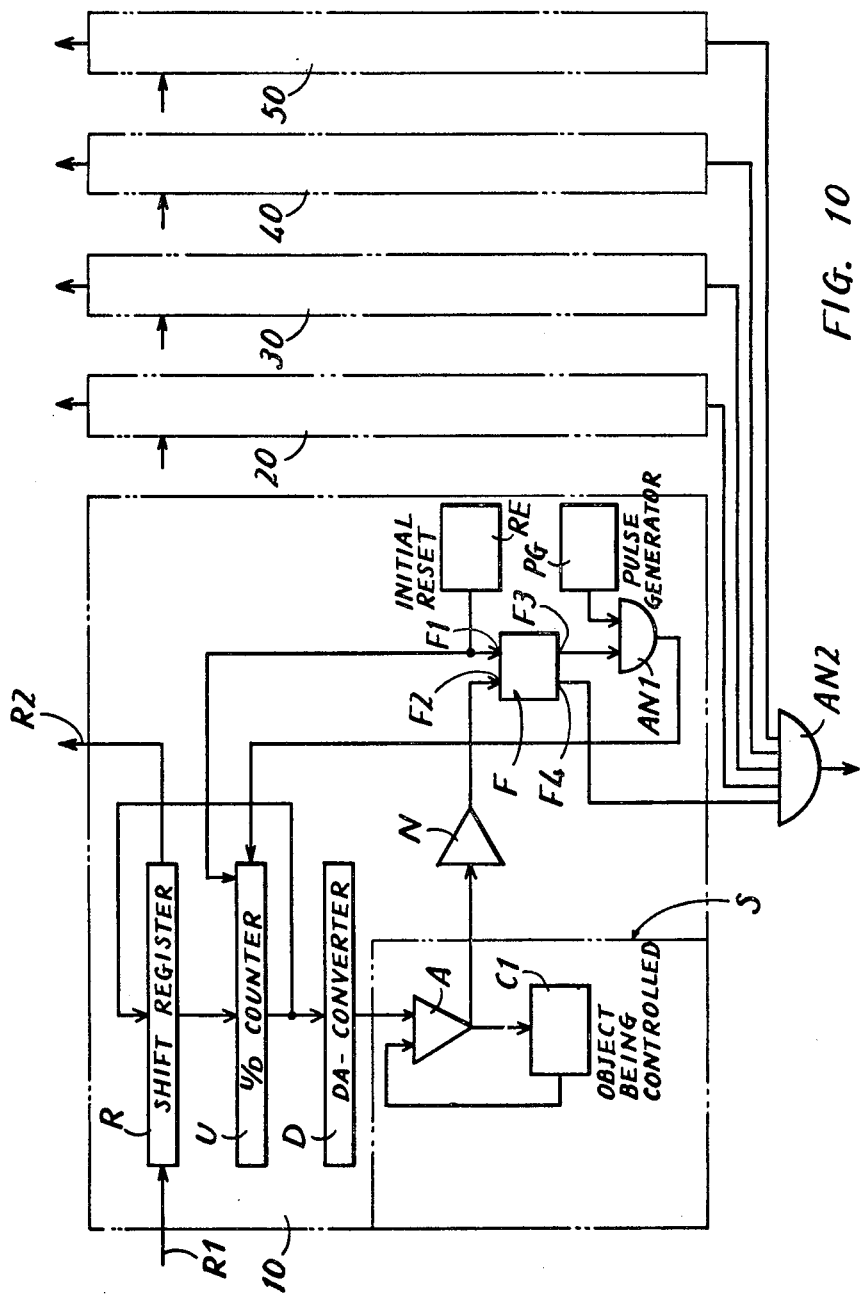
FIG. 10 is a block diagram showing the present position control device which serves as a basis for the position control device of one embodiment of the present invention.

FIG. 10 is a block diagram showing a present time position control device which serves as a basis for the position control device in one embodiment of the present invention. This present time position control device sets the present time position digital information in the automatic control device including an analog servo system which operates by an analog feedback signal. The present time position control device is provided with a shift register R for storing the digital information, an up/down counter U capable of mutually presetting the shift register R and its information, a digital/analog converter D for converting the information of the up/down counter U into an analog form, an analog servo system S controlled by the output of the digital/analog converter D, a zero detecting circuit N connected to the output of the servo amplifier A of the analog servo system S, and a flip-flop circuit F which is set by the output of the zero detecting circuit N and reset by the output of an initial reset circuit RE. The information of the up/down counter U is controllable by the inversion output of the flip-flop circuit F, and also the output thereof can be taken out as an unlock signal.

In an embodiment of FIG. 10, there is shown a case where the present invention has been embodied for the automatic welding apparatus with five degrees of freedom. Numerals 10, 20, 30, 40 and 50 each show a device corresponding to each degree of freedom for the automatic welding apparatus shown in FIG. 1 and 3 having five degrees of freedom, each structure thereof being the same. The construction of the device 10 corresponding to the up and down (or Z direction) position control of the torch fixture of the automatic welding apparatus will be described hereinafter more fully.

The shift register R is provided with an input terminal R1 for the digital information from a program device (not shown) for controlling the Z direction positions of the torch fixture, and an output terminal R2 for serially outputting the information.

The analog servo system S includes a servo amplifier A and and object C1 to be controlled, such as a prime mover for driving the torch fixture in the Z direction. The servo system S is controlled by the analog input from the converter D. Namely, the analog input is, first, inputted to the servo amplifier A. The output from the potentiometer whose rotation angle is determined by the up and down positions of the object being controlled C1, namely, the torch fixture is also inputted to the amplifier A. This type of analog servo system is well known to those skilled in the art. The zero detecting circuit N is constructed to detect the zero of the output of the amplifier A. Namely, the circuit N detects a time when the control position of the controlled object C1 agrees with the control information from the input R1 to provide the output.

The initial reset circuit RE is connected to the counter U to clear the digital information of the counter U, and is also connected to the input F1 of the subsequent flip-flop F to reset the flip-flop F. The output of the zero detection circuit N is connected to the input F2 of the flip-flop F. An inversion output F3 of the flip-flop F corresponding to the input F1 is applied to the subsequent AND gate AN1. Also, the output F4 of the flip-flop F corresponding to the input F2 is applied to an AND gate AN2.

Furthermore, pulses from the pulse generator PG are given to the AND gate AN1. Accordingly, the AND gate AN1 is activated by the inversion output F3 to input the pulse from the pulse generator PG to a counter U. The input to the counter U from the gate AN1 makes addition to and subtraction from the digital information of the counter U.

The output F4 may be used as an unlock signal for releasing the lock of the control circuit (not shown) for controlling the up and down positions of the object being controlled C1. However, in this embodiment, in order to simultaneously release the respective locks of, for example, a back and forth position (Y) control circuit of the object being controlled C1 corresponding to the device 20, a right and left positon (X) control circuit of the object being controlled C1 corresponding to the device 30, a rotational position ($\phi$) control circuit of the object being controlled C1 corresponding to the device 40, and a rotation position ($\theta$) control circuit of the object being controlled C1 corresponding to the device 50, an output is taken from the AND gate AN2 receiving inputs thereto the respective outputs from the devices 10 (as from F4), 20, 30, 40 and 50 and is utilized as an unlock signal for releasing the lock of the control circuits (not shown) of the entire automatic welding apparatus.

The operation thereof will be described hereinafter with reference to FIG. 10. Assume that power source for the devices 10, 20, 30, 40, 50 and the control circuit for the automatic welding apparatus is once switched off and is switched on again. At this time, assume that the control circuit is locked by well known means (not shown in detail). Accordingly, the automatic welding apparatus is not operated by this control circuit.

Next, the circuit RE is operated to clear the counter U. At the same time, the output of the circuit F appears at F3, and the pulses from the generator PG are inputted to the counter U through the circuit AN1 sequentially. The numerical value within the counter U is varied sequentially. The counter U output is inputted to the converter D sequentially and is converted into analog values. The analog value is applied to the servo amplifier A. The analog value corresponding to the present time up and down positions of the object being controlled C1 is inputted to the amplifier A, and no output is provided from the circuit N unless the difference therebetween is zero. When an input value for the amplifier A from the converter D has become equal to an analog value corresponding to the present time position of the object being controlled C1 by change of the numerical value within the counter U, and the output from the amplifier A has become zero, the circuit N generates an output and the output of the circuit A is changed over to F4. Accordingly, the pulse from the circuit AN1 is not applied to the counter U any more, and the numerical value within the counter U becomes a certain value. As the outputs from the devices 10 (as from F4), 20, 30, 40 and 50 are provided together, unlock of the automatic welding apparatus of the control circuit is effected by the output signal from the circuit AN2. The numerical value within the register R becomes equal to the numerical value within the counter U and the present time up and down position information of the object being controlled C1 is set. Subsequently, the automatic welding apparatus starts the following action by the sequential information from the input R1. The signal from the output R2 is used for making the program by, at first, sequentially bringing the objects being controlled of the automatic welding apparatus to a desired position and recording the each point on the tap.

Figure 11:
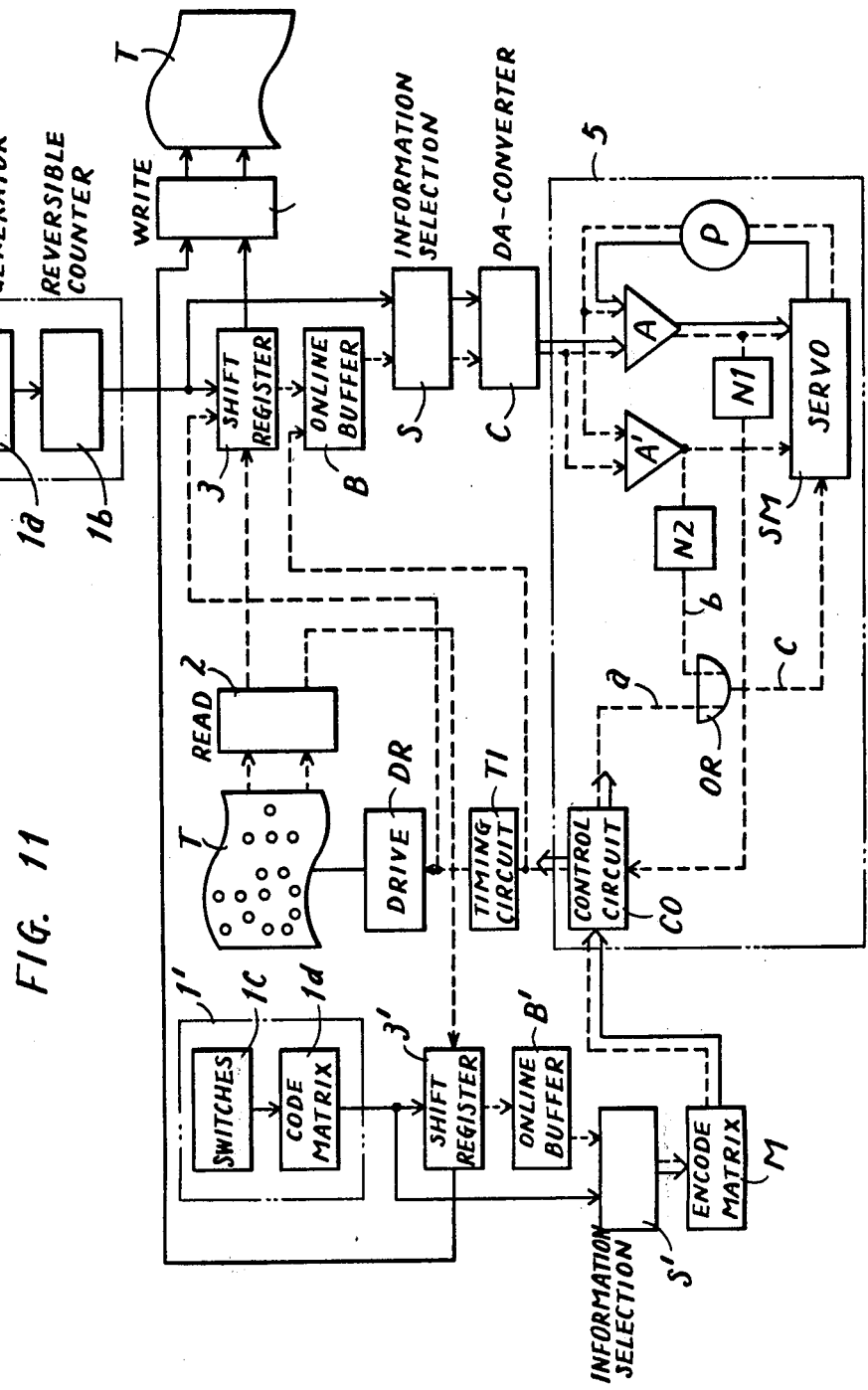
FIG. 11 is a block diagram showing the position control device of another embodiment of the present invention.

FIG. 11 is a block diagram showing the position control device of another embodiment of the present invention. A major portion of the FIG. 11 embodiment is based on the FIG. 9 embodiment. Therefore, like parts are designated by like reference characters. As described hereinbefore, the embodiment shown of the present invention is characterized by detecting whether the output of the servo amplifier A has become near zero to provide a signal, storing the value of ths shift register 3 in the buffer register B, furthermore operating the timing circuit T1 to step forward the output means, for example, the reader 2 and inputting the output to the shift register 3. The zero detection circuit N1 is connected to the output of the servo amplifier A for this purpose. The zero detection output is applied to a control circuit CO. The control circuit CO generates pulses immediately by command from the device 2 or after a time interval. The value of the register 3 is stored in the buffer B by the pulse signal and also the timing circuit T1 is operated to step forward the drive device DR by one word, whereby the following position command signal is outputted to the buffer B. When the object being controlled has reached a command position, the next position command signal is inputted to the buffer B immediately. It is thus understood that the object being controlled moves to control the position continuously.

Figure 12:
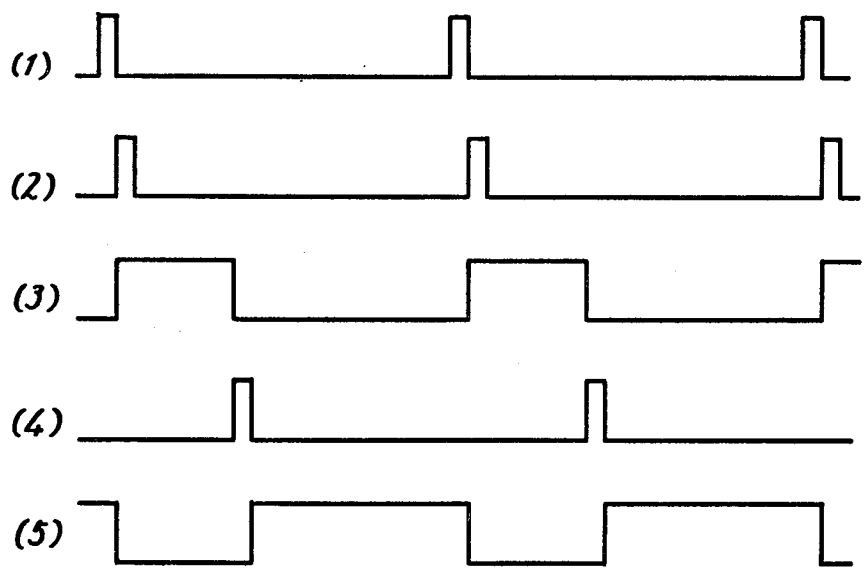
FIG. 12 is a timing chart of the conventional system.

FIG. 12 is a timing chart of the FIG. 9 embodiment. FIG. 12 (1) shows a pulse signal by a signal from the zero detection circuit. A reading start signal (FIG. 12 (2)) of the next information is generated by this signal and the next information is loaded by this signal. A high level signal period of FIG. 12(3) shows the information being loaded. After completion of loading, such a loading completion signal such as FIG. 12(4) is taken out. Execution of the information is effected in response to the loading completion signal. FIG. 12(5) shows a condition wherein mechanical action is effected, based on such a signal as described hereinabove. Referring to FIG. 12(5), the high level period shows the machine being operated. Accordingly, the machine remains inoperative in a period while the next information is loaded. Therefore, it is found out that the action of the machine is not continuous in the FIG. 9 system.

Figure 13:
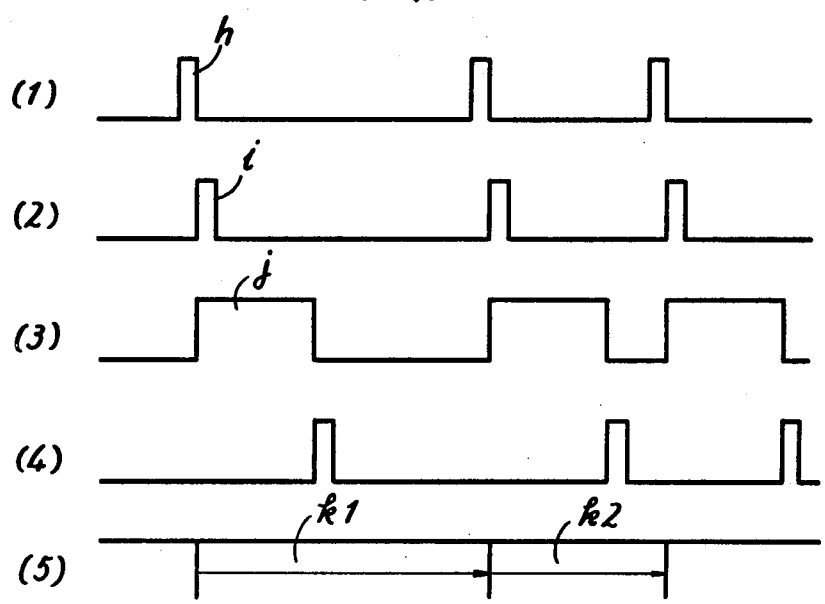
FIG. 13 is a timing chart of the inventive system shown in FIG. 11.

FIG. 13 is a timing chart of the FIG. 11 embodiment. Each of FIG. 13(1), (2), (3), (4) and (5) corresponds to each of FIG. 12(1), (2), (3), (4) and (5), respectively. It is to be noted, however, that as soon as execution (K1) of information of one point before is started by a signal h, for example, from the zero detection circuit, a start signal (i) for loading the next information is applied. A piece of information corresponding to the next machine action K2 is loaded during a loading period j of the information. Namely, since the next information is loaded already in a period during which the machine operation is effected, the machine operation does not stop while the information is being loaded as in FIG. 12. FIG. 13(4) shows a loading completion signal, but the loading completion signal is not required except in a particular case.

Figure 14:
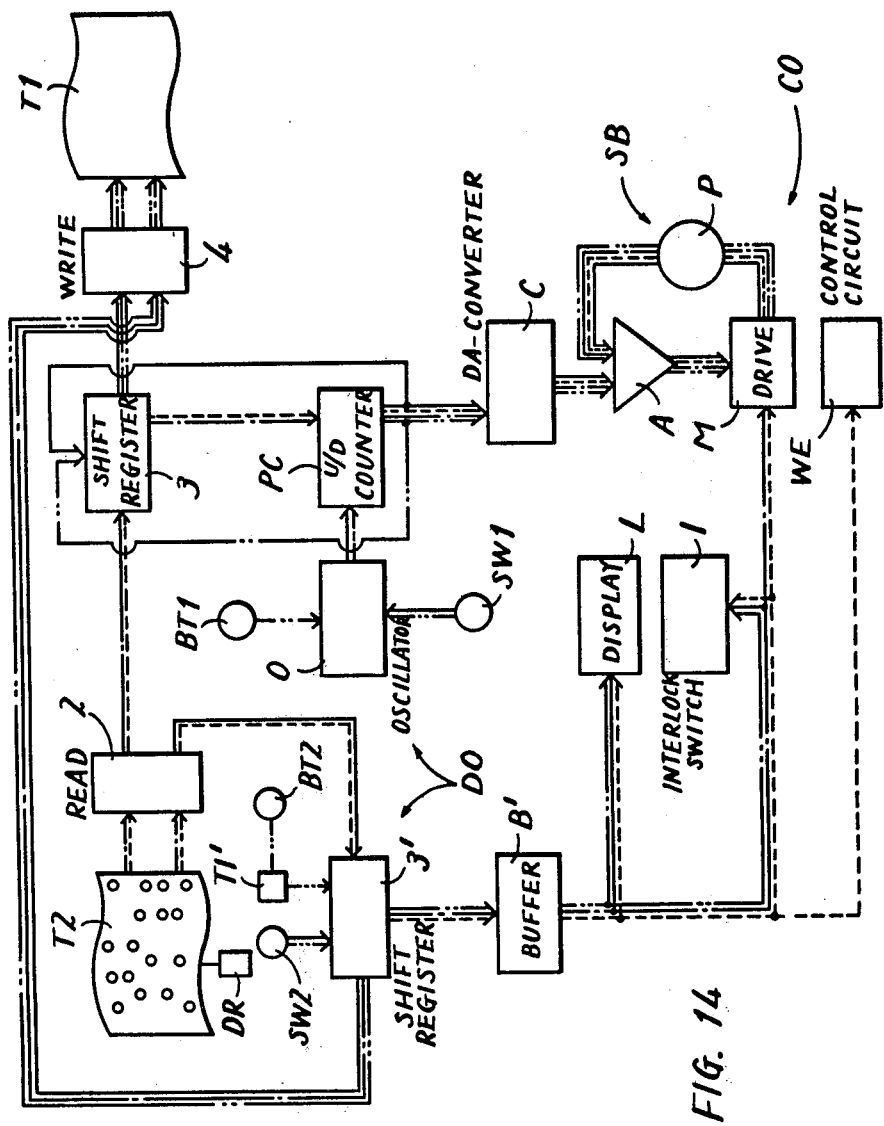
FIG. 14 illustrates a block diagram of a numerical value control device similar to the FIG. 9 device but improved therefrom.

FIG. 14 illustrates a block diagram of a numerical value control device similar to the FIG. 9 device but improved therefrom. Although the FIG. 9 device is aimed to accomplish the facility of writing a program in a punched tape through a simple playback operation, without using a key punch operator, by taking advantage of a punched tape, it is still difficult to avoid a mistake in writing through inadvertence by an operator during a playback operation. If and when an error is found in testing by reproducing the control operation of the objects to be controlled through execution of the erroneously written tape, teaching had to be done again from the beginning in order to correct the abovementioned errors in the tape. Therefore, the FIG. 14 device has been improved to ensure that any errors found in testing can be corrected with ease and accuracy.

In FIG. 14, the same portions are designated by the same reference characters as those in FIG. 9, and a flow of signals in the teaching mode, including writing, is shown in solid lines, a flow of signals in the testing mode is shown in one-dotted lines, a flow of signals in correcting in the testing mode is shown in two-dotted lines, and a flow of signals in the automatic control mode is shown in dotted lines, respectively. Further it is to be pointed out that the numerical value output device 1 and the online buffer B in FIG. 9 have been replaced by a presettable up/down counter PC in the FIG. 14 embodiment.

In the test and automatic operation modes, the shift register 3 is connected such that one channel of the read value out of those in five channels indicating the instructing positions in the abovementioned five axes. In the teaching mode and in correcting in the test mode, however, connection is done such that an output from the counter PC is an input to the shift register 3. Further, in the writing mode, an output from the shift register is written by the device W in the tape T1. A switch SW1 is connected to an oscillator O, so that operation of the switch SW1 causes the oscillator output to be inputted to the counter PC, whereby the numeral values are varied. Further, a correcting push button BT1 is provided to the oscillator O. In correcting, the push button BT1 is depressed to enable the switch SW1, so that an output from the oscillator O changes the contents of the counter PC, which contents are inputted to the device 4 in preference to an output from device 2. An output from the counter PC is connected so as to be inputted to the converter C, as to be described subsequently.

A servo system SB comprises a differential amplifier A, a drive device M and a potentiometer P. The drive device M makes displacement of each object being controlled with respect to one axis out of the five axis, and is so adapted to be selectable of either high speed or low speed on the ocassion of the abovementioned displacement of the object being controlled. The servo system SB, the shift register 3, the counter PC, the oscillator O, and the converter C are provided for each axis of X, Y, Z θ and φ, individually, i.e., five sets of the servo system SB, the register 3, etc. are provided for each of five axes of X, Y, etc. individually. It is pointed out that only one such set is shown in FIG. 14.

An indication lamp L and an interlock switch I are connected to an output of the buffer B'. The lamp L is constructed as a group of the indication lamps for indicating "high" or "low" of the moving speed per each of said five axes of the objects being controlled, four stages of welding current for the torch, and on or off of the interlock switch. Upon closing of the interlock switch I, a timer (not shown) is enabled. A signal from the buffer B' on the occasion of the automatic operation is fed to the control circuit WE. The control circuit WE serves as a control device for welding apparatus including the torch TC for controlling the welding current for the torch TC in four stages.

To the shift register 3' are connected four switches SW2, each for three bits out of twelve bits. In FIG. 14 only one switch is shown representing the others. Two out of these four switches are switches for selecting the moving speed commonly for the X, Y, and Z axes of the objects being controlled and high or low of the rotational speed for the θ axis, while the remaining two are a rotary switch for selecting the four stages of the welding current of the torch and a switch for selecting on or off of the interlock. The correcting push button BT2 is connected through a timing circuit TI' to the shift register 3', each corresponding to each of the four switches SW2, respectively. Upon operation of the switches SW2 on the occasion of the writing and correcting, a selected signal is inputted through the shift register 3' to the device 4. On the occasion of the testing and automatic operation, signals from the device 2 for instructing high or low of the moving speed of the objects being controlled, the four stages of the welding current of the torch, and on or off of the interlock are fed through a shift register 3' to the device 4 and through the buffer B' to the lamp L, switch I and the device WE. Upon operation of the button BT2 on the occasion of correcting the switch SW2 is enabled and a signal therefrom is inputted to the device 4 in preference to the output from the device 2.

A numeral value output device DO capable of outputting any magnitude of the numeral values of plurality of words necessary for control comprises the oscillator O, the counter PC, the switches SW1 and SW2, the buttons BT1 and BT2. A control mechanism CO for controlling the objects being controlled comprises the lamp L, the switch I, the system SB, and the device WE.

Now the operation of the FIG. 14 embodiment will be described. In the teaching mode a tape T1 is set in the device 4. A change over switch (not shown) is changed to teaching so that connection as shown in solid lines in FIG. 14 is provided. Proper operation of the switch SW1 makes the oscillator O enabled, so that the counter PC generates numeral values of five channels for controlling the position and the attitude of the torch TO and the workpiece WO. The numeral values thus generated are inputted through the converter C to the system SB, so that freedom of the five axes of the torch and the workpiece G is controlled, thereby bringing the welding point at the end of the torch TC to a point on the workpiece G where welding should be started. Then the switch SW2 is operated for making the moving speed high.

Upon depression of a start button (not shown), the numeral values of the five channels generated in the counter PC are punched to the tape T1 through the register 3 and by means of the device 4, and the commanding or instructing contents by the switch SW2 are punched to the tape T1 through the register 3' and by means of the device 4.

Then the welding point at the end of the torch is brought to a point on the workpiece where welding should be done, in the same manner as mentioned before, by properly operating the switch SW1. At the same time selection is done using the switch SW2 as to whether the movement to the abovementioned point should be done at the high speed. Usually movement from a point to a point with welding is done at the low speed and such movement without welding is done at the high speed. The magnitude of the welding current for the torch is selected by the switch SW2. Again the "start" button is depressed and, as described above, the contents in the counter PC is written in the tape T1 through the register 3 and by means of the device 4, and the commanding or instructing information is also punched in the tape T1 through the register 3' and by means of the device 4.

Likewise, hereafter, the commands or instructions from point to point are punched in the tape T1 in turn by means of the device 4. In the event it is desired that an intermitting time is provided, using a timer (not shown), in the course of the abovementioned movement from point to point, the interlock command or instruction is punched in the tape T1, by operating the switch SW2 corresponding to said command or instruction.

Thus teaching of a full data as to the movement for all the welding with respect to the workpiece G and the separating movement of the torch TC thereafter is completed and a punched tape T1 comprising the abovementioned program is obtained.

In the next step the tape T1 is set in the device 2 by way of the tape T2 and a change over switch (not shown) is switched to "test" position, so that circuit connection as shown in onedotted lines in FIG. 14. is formed.

Now, upon every depression of the start button, the device 2 reads the tape T2 one word by one word, i.e., 12 bits by 12 bits, to load them in the shift registers 3 and 3', and the device 4 writes in the tape T1 the contents stored in the shift registers 3 and 3'. Of numeral value signals thus read out, those of five channels for use in control of the position are transferred through the shift register 3 and the counter PC to the converter C to convert them into analog signals, which are inputted to the system SB to control the position and attitude of the workpiece and the torch. More specifically, upon depression of the start button, the welding point at the end of the torch TC is brought to a position where the welding of the workpiece should start. Of numeral value signals thus read out, that of one channel for providing command or instruction is transferred through the shift register 3' and the buffer 3' to the lamp L, the switch I and the device M. Thus the control of the initial position as mentioned above is carried out at the high speed. In the event there is no error in the review of the abovementioned initial one word, then the start button is again depressed, so that the device 2 reads out the next one word and the abovementioned numeral values of no error are written in the tape T1 by means of the device 4. Thus, through this reading, the following instructions are reviewed. In the event there is an error in the control of the position, then the button B1 is depressed and the switch SW1 is operated to correct the contents in the counter PC, so that the position and attitude of the workpiece G and the torch TC are corrected. If there is an error in the other instructions, it is detected by the lamp L and the button BT2 is depressed and the switch SW2 is operated to correct the contents in the shift register 3', so that the abovementioned error in the instructions is corrected. Thereafter, upon depression of the start button (not shown), the device 2 reads the next word in the tape T2, and the output thereof is loaded in the shift registers 3 and 3', and at the same time the original numeral values or the abovementioned corrected values which have been stored in the shift registers 3 and 3' are written in the tape T1 by means of the device 4. In making the abovementioned correction, operation of the switches SW1 and SW2 without depressing the buttons BT1 and BT2 result in an non-operative condition, thereby ensuring that an inadvertent erroneous operation of the switches SW1 and SW2 correction of which is needed is prevented from changing the contents in the counter PC and the shift register 3' against the operator's intention. Thus check and correction are made one word by one word and the correct program as desired is punched in the tape T1.

In order to execute the program properly punched in the tape T1, by setting it in the device 2 by way of the tape T2, the abovementioned change over (not shown) is switched to the "automatic operation" position and the abovementioned "start" button (not shown) is depressed, so that the device 2 reads the tape T2 12 bits by 12 bits and the position controlling signal is transferred through the shift register 3, counter PC, the converter C and the system SB to control the position of the objects to be controlled. The other control signal flows through the shift register 3', the buffer B', the lamp L, the switch I, the device WE and the device M. At each time each of the instructions of twelve bits is executed and completed, the device is immediately driven by means of a sequence control, or if and when the timer is operated, the device DR is operated, after the set timing, so that the contents in the tape T2 are automatically executed sequentially. On that occasion the device 4 is inoperative.

In making correction at the time of the abovementioned test, it might be desired that the other commands or instructions are inserted. For that purpose, the change over switch is temporalily switched to the "teaching" position. If it is desired that certain instructions are erased, energization to the device 4 is temporalily cut. Mnay other various modifications of usage of the apparatus may be considered.

Figure 15:
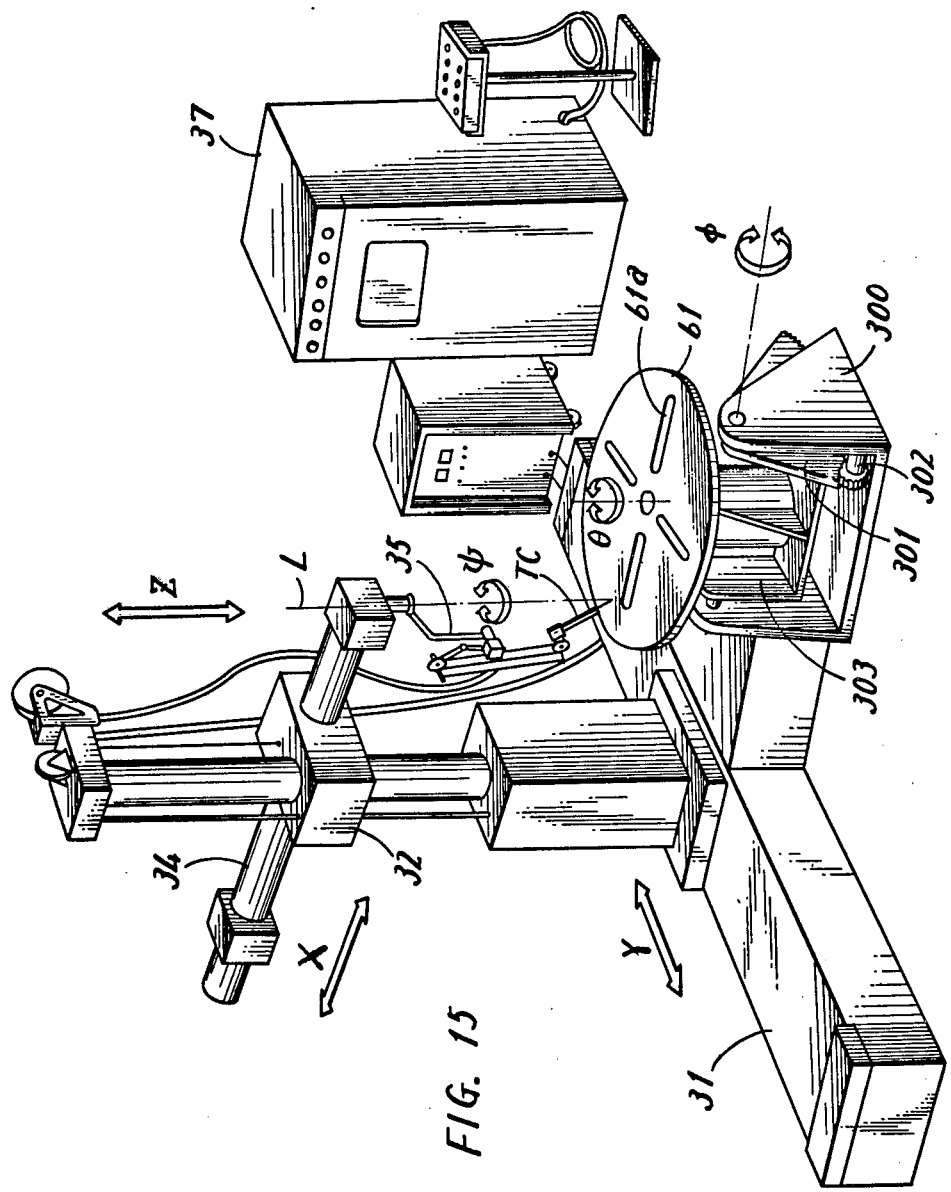
FIG. 15 shows a perspective view of a further embodiment of the present invention, which has been improved from the FIG. 3 embodiment.

FIG. 15 shows a perspective view of a further embodiment of the present invention, which has been improved from the FIG. 3 embodiment. Although the detailed structure of the FIG. 15 embodiment is different from that of FIG. 3, the FIG. 15 embodiment is substantially the same as the FIG. 3 embodiment in respect of the basic features thereof. Therefore like portions of the FIG. 15 embodiment have been designated by the same reference characters as used in FIG. 3. The structure and operation of the FIG. 15 embodiment in connection with such basic features will be readily understood by those skilled in the art based on the foregoing description in conjunction with FIG. 3 and with simultaneous reference to FIG. 15. In the following, therefore, the structure and operation of a specific feature portion will be described, which has been uniquely employed in the FIG. 15 embodiment.

With reference to FIG. 15, the workpiece fixture 61 is provided in a U shaped supporting member 303 for rotation about the $\theta$ axis. The supporting member is mounted on a U shaped frame 300 for rotation about an axis as shown as $\phi$ in the drawing, which $\phi$ axis extends in the same direction as the X direction. Adjacent to one side of the U shaped supporting member 303 is provided a fan shaped gear 301, which is engaged with a prime mover 302 for driving the fan shaped gear 301 for rotation about the $\phi$ axis. The rotation of the U shaped supporter 303 and thus of the workpiece fixture 61 is controlled by the prime mover 302 such that a tilting angle of the workpiece fixture 61 is changed from zero degree, i.e., the same direction as the Y direction, to ninty degree, i.e., the same direction as the Z direction. The prime mover may be so adapted that the rotational angle thereof may be manually adjusted. In a preferred embodiment, however, the control system described in conjunction with FIGS. 9, 10, 11 and 14 is further provided with an additional channel for control of the rotational angle $\phi$ of the prime mover 302 and thus of the workpiece fixture 61. Such provision of the additional channel for rotation of the fixture 61 about the $\phi$ axis is obvious to those skilled in the art from the description with reference to FIGS. 9, 10, 11 and 14.

Now a typical advantage of the FIG. 15 embodiment will be discussed in the following. Without rotation of the workpiece fixture 61 about the $\phi$ axis or without control of the tilting angle of the fixture 61, the fixture 61 can only rotate about the Y axis. In such a situation, it can happen that a corner formed between two metal plates in contact with each other at the right angle, for example, can not be orientated such that the corner is directed just downward. In case where welding is effected in such a situation to the metal plates, which are relatively thicker, the filler metal is likely to much less melted with the metal plates, because the melted filler metal is liable to flow undesirably, with the result of poor welding. However, the FIG. 15 embodiment will enable any desired orientation of the workpiece fixture with respect to the horizontal direction and thus avoids the abovementioned disadvantage encountered with the embodiments shown in FIGS. 1 and 3.

The automatic welding apparatus may be provided with a program device for outputting a piece of command information which sets weaving conditions associated with a right angle coordinate axial direction of the torch and/or the workpiece to be welded, and a weaving repetition control means for continuously effecting the weaving in accordance with the command information. Furthermore, a means for setting the weaving conditions may be interposed between the program device and the weaving repetition control means. Thus, the automatic welding apparatus with weaving control device is also obtained.

Several features of the abovementioned embodiments of the present invention are listed in the following.

1. Since the workpiece fixture is adapted to rotate around the horizontal axis H, the welding line of the workpiece can be always orientated on the upper side, whereby the welding operation can be effected under a better attitude (downward attitude) of the torch and the workpiece in terms of the welding conditions.

2. Since the degrees of freedom are divided between the workpiece fixture and the torch fixture, the construction of the present invention is simpler as compared with an apparatus in which either one of the fixtures is provided with all the degrees of freedom.

3. As compared with apparatus for controlling the space position of conventional cylindrical coordinates or polar coordinates to effect automatic welding, the welding line of the workpiece of the present invention is generally adapted to extend in three directions such as back-and-forth, lateral and vertical directions. Accordingly, programming of automatic welding is simpler. Also, the control device does not always require such comlex means as interpolating means.

4. Since the workpiece fixture simply rotates around the horizontal axis, the workpiece of considerably bigger size can be handled.

5. Although the control is of a PTP control type, it can continuously control the position of the object being controlled such as the torch, etc., thus resulting in remarkably superior welding finish.

Although the embodiment of the automatic welding apparatus in accordance with the present invention has been described in detail, it is understood that modifications and variations of the present invention are possible without departing from the true spirit and the scope of the invention.

We claim:
1. An automatic welding apparatus comprising:
a workpiece fixture for securing a workpiece thereto, said workpiece fixture being rotatable about an axis,
a welding torch,
means for holding said welding torch,
means for movably mounting said welding torch holding means including:
a guide extending in a first, horizontal direction,
a first sliding member mounted on said guide for sliding movement in said first, horizontal direction,
a second sliding member mounted on said first sliding member for sliding movement in a second, vertical direction, and
a third sliding member mounted on said second sliding member at an extremity thereof for sliding movement in a third, horizontal direction orthogonal to said first and second directions,
said welding torch holding means being carried by said third sliding member for rotation about an axis parallel to said second, vertical direction,
means for mounting said workpiece fixture for rotation about an axis extending parallel to said first, horizontal direction, and
means controlling the respective rotations of said workpiece fixture and said torch holding means and for controlling said movable mounting means for adjusting the relative positional relationship in said three directions of said workpiece fixture and said torch holding means.

2. An automatic welding apparatus as recited in claim 1, which further comprises means for balancing the weight of said second sliding member.

3. An automatic welding apparatus as recited in claim 2, wherein said weight balancing means comprises pulleys connected to each of said guide and said first and second sliding members and a cable joined at a first end to said guide and carrying a weight counterbalancing element at the second, opposite end thereof, said cable extending about said pulleys of said second and third sliding members and said pulley on said guide, said counterbalancing weight element operating through said cable and said pulleys to counterbalance the weight of said second sliding member.

4. An automatic welding apparatus as recited in claim 1 wherein:
said torch includes an axial extension defining a welding point, and
said torch holding means holds said torch to position said welding point thereof in alignment with said vertical axis.

5. An automatic welding apparatus in accordance with claim 1, which further comprises an adaptor detachably mounted at the end of said torch, said adaptor comprising a needle for indicating a welding point by the pointed end thereof and an elastic member for carrying said needle.

6. An automatic welding apparatus comprising:
a workpiece fixture for securing a workpiece thereto, said workpiece fixture being rotatable about a first axis,
means for mounting said workpiece fixture, said mounting means including a member movable in a first direction parallel to said first axis of rotation and in a second direction orthogonal to said first direction,
a welding torch,
means for holding said welding torch,
an arm movable in a third direction orthogonal to said first and second directions, said torch holding means being mounted on said arm for rotation about an axis extending parallel to said third direction, and
means for controlling the respective rotations of said workpiece fixture and said welding torch holding means and for controlling the positional relationship of said movable member in said first and second directions and of said arm in said third direction.

7. An automatic welding apparatus in accordance with claim 6 in which said movable member comprises:
a carriage mounted for sliding movement in said second direction, and
a member mounted on said carriage for sliding movement in said first direction, said workpiece fixture being mounted on said member for rotating a workpiece secured thereto about said first axis.

8. An automatic welding apparatus in accordance with claim 6 wherein:
said torch defines at one extremity thereof a welding point, and
said torch holding means holds said torch for positioning said welding point thereof in alignment with said second axis.

9. An automatic welding apparatus comprising:
a workpiece fixture for securing a workpiece thereto, said workpiece fixture being rotatable about an axis,
a welding torch,
means for holding said welding torch, said holding means being rotatable about an axis,
means for mounting each of said workpiece fixture and said welding torch holding means, said mounting means for at least one of said workpiece fixture and said welding torch holding means being movable in three dimensions as defined by mutually orthogonal first, second and third directions, thereby to selectively adjust the relative positional relationship of said workpiece fixture and said welding torch holding means,
said mounting means for said workpiece fixture including means for altering the tilt angle of said workpiece fixture relative to said axis of rotation thereof, and
means for controlling the respective rotations of said workpiece fixture and said welding torch holding means, and for controlling said movable mounting means for adjusting said three dimensional relative positional relationship of said workpiece fixture and said welding torch holding means.

10. An automatic welding apparatus as recited in claim 9 wherein said control means further includes means for controlling said tilt angle altering means to control automatically said tilt angle of said workpiece fixture.

11. An automatic welding apparatus comprising:
a workpiece fixture for securing a workpiece thereto, said workpiece fixture being rotatable about an axis,
a welding torch,
means for holding said welding torch, said holding means being rotatable about an axis,
means for mounting each of said workpiece fixture and said welding torch holding means, said mounting means for at least one of said workpiece fixture and said welding torch holding means being movable in three dimensions as defined by mutually orthogonal first, second, and third directions, thereby to selectively adjust the relative positional relationship of said workpiece fixture and said welding torch holding means, and
means for controlling the respective rotations of said workpiece fixture and said welding torch holding means and of said movable mounting means for adjusting said three dimensional relative positional relationship of said workpiece fixture and said welding torch holding means, said controlling means including:
storage means for storing information necessary for control of said respective rotations of said workpiece fixture and said welding torch holding means and said adjustment of said relative positional relationship of said workpiece fixture and said welding torch holding means,
means for reading information from said storage means,
a shift register for storing said information read from said storage means and providing an output in accordance with said stored information, and
a control mechanism responsive to an output from said shift register of said information stored therein for controlling said respective rotations of said welding torch holding means and said workpiece fixture and for controlling said adjustment by said movable mounting means of said relative positional relationship of said workpiece fixture and said welding torch means.

12. An automatic welding apparatus in accordance with claim 11, in which said storage means comprises a punched tape and said means for reading comprises a punched tape reader.

13. An automatic welding apparatus in accordance with claim 12 further comprising:
means for providing said information necessary for control,
means for selectively supplying said information from said providing means and from said punched tape storage means to said shift register, means for punching a tape for storing information therein, and means for supplying information stored in said shift register to said tape punching means for storage of information read from said shift register in a punched tape, said information including information for control and for testing of said automatic apparatus, said tape reader reading out said information from said punched tape, and said control mechanism of said controlling means responding to said read out information selectively for control and for testing of operation of said automatic welding apparatus.

14. An automatic welding apparatus as recited in claim 13, which further comprises:

means for correcting information erroneously punched in said tape, said correcting means being responsive to a test mode of said apparatus for supplying said information from said information providing means through said shift register to said writing means and said control mechanism, in preference to said information read by said tape reader from said tape.

15. An automatic welding apparatus as recited in claim 11 wherein:

said control mechanism comprises a servo system including a servo amplifier responsive to said output of stored information from said shift register, means for generating a signal in response to an output of said servo amplifier in the vicinity of a zero value, and means responsive to the zero value output signal of said signal generating means for producing a stepping operation of said information providing means to load the information provide thereby to said shift register for storage therein.

16. An automatic welding apparatus in accordance with claim 11, in which said control mechanism comprises a servo system comprising a servo amplifier operable in response to information from said shift register, and which further comprises means for generating a signal in response to an output in the vicinity of the zero value in said servo amplifier, an up/down counter cooperative with said shift register for presetting said information, a digital/analog converter for converting said information in said up/down counter to an analog format output signal, said analog format output signal being applied to said servo amplifier, means for generating a signal for clearing said information in said up/down counter, and a flip-flop set in response to said signal output of said signal generating means and reset in response to said clear signal from said clear signal generating means.

* * * * *

UNITED STATES PATENT AND TRADEMARK OFFICE
CERTIFICATE OF CORRECTION

PATENT NO.   : 4,014,495
DATED        : March 29, 1977
INVENTOR(S)  : Tatsuharu Oda, et al It is certified that error appears in the above-identified patent and that said Letters Patent are hereby corrected as shown below:

Column 6, line 60, before "sectional" insert --a--.
Column 16, line 9, "on or off" should be --"on" or "off"--.
Column 16, lines 25 and 26, "on or off" should be --"on" or "off"--.
Column 16, line 34, "high or low" should be --"high" or "low"--.
Column 16, line 36, "on or off" should be --"on" or "off"--.
Column 16, line 53, "teaching" should be --"teaching"--.
Column 16, line 66, "start" should be --"start"--.
Column 17, line 39, "onedotted" should be --one-dotted--.
Column 17, line 41, "start" should be --"start"--.
Column 17, line 52, "start" should be --"start"--.
Column 17, line 62, "start" should be --"start"--.
Column 18, line 8, "start" should be --"start"--.
Column 18, line 47, "temporalily" should be --temporarily--.
Column 18, lines 49 and 50, "temporalily" should be --temporarily--.
Column 18, line 50, "Mnay" should be --Many--.

Signed and Sealed this

Seventh Day of June 1977

[SEAL]

Attest:

RUTH C. MASON
*Attesting Officer*

C. MARSHALL DANN
*Commissioner of Patents and Trademarks*